United States Patent
Murayama et al.

(10) Patent No.: US 9,246,419 B2
(45) Date of Patent: Jan. 26, 2016

(54) METHOD AND SYSTEM FOR CONTROLLING MOTOR

(71) Applicant: SAMSUNG SDI CO., LTD., Yongin-si, Gyeonggi-do (KR)

(72) Inventors: Yoshinari Murayama, Yokohama (JP); Futoshi Yamane, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 94 days.

(21) Appl. No.: 14/067,872

(22) Filed: Oct. 30, 2013

(65) Prior Publication Data

US 2014/0217933 A1 Aug. 7, 2014

(30) Foreign Application Priority Data

Feb. 6, 2013 (JP) .................................. 2013-021282
Jul. 16, 2013 (KR) ........................ 10-2013-0083782

(51) Int. Cl.
*H02P 1/00* (2006.01)
*H02P 6/08* (2006.01)
(Continued)

(52) U.S. Cl.
CPC ... *H02P 6/08* (2013.01); *B60K 6/26* (2013.01); *B60K 6/485* (2013.01); *B60W 20/106* (2013.01);
(Continued)

(58) Field of Classification Search
CPC ............ B60K 6/00; B60K 6/26; B60K 6/268; B60K 6/28; B60K 6/42
USPC .................. 318/1, 139, 136, 400.07, 400.15, 318/400.23, 431, 432, 434, 11, 55, 59, 66, 318/146, 163, 715, 721, 772, 776, 779, 799, 318/823, 268, 369; 310/68 B, 92, 76, 78, 310/100; 180/69.4, 65.21, 69.3, 65.28, 180/65.29, 65.285, 284, 335, 170, 338, 180/364; 701/22, 54, 103, 104, 112, 123, 701/84, 90

See application file for complete search history.

(56) References Cited

U.S. PATENT DOCUMENTS 4,335,429 A * 6/1982 Kawakatsu ............ B60K 6/387
                                                                     180/65.23
6,083,138 A * 7/2000 Aoyama ................... B60K 6/48
                                                                      180/65.7

(Continued)

FOREIGN PATENT DOCUMENTS

EP           2 112 015 A1      10/2009
JP           2001-339804 A     12/2001

(Continued)

OTHER PUBLICATIONS

EPO Search Report dated Jun. 3, 2014, for corresponding European Patent application 14153585.6, (6 pages).

(Continued)

*Primary Examiner* — Shawki S Ismail
*Assistant Examiner* — Jorge L Carrasquillo
(74) *Attorney, Agent, or Firm* — Christie, Parker & Hale, LLP (57) ABSTRACT

A method for controlling a motor to enable drive assist of an engine with a high torque in a low rotation speed range as well as synchronized driving in a high rotation speed range. The method includes controlling a motor connected to a low voltage battery. The motor has a reluctance torque higher than a magnetic torque at a time of a highest torque generation. The motor includes a rotor connected to an output shaft of an engine.

14 Claims, 5 Drawing Sheets

(51) Int. Cl.
*H02P 3/14* (2006.01)
*B60W 30/18* (2012.01)
*B60W 20/00* (2006.01)
*B60K 6/26* (2007.10)
*B60K 6/485* (2007.10)
*B60W 50/00* (2006.01)

(52) U.S. Cl.
CPC .......... *B60W 30/18127* (2013.01); *H02P 3/14* (2013.01); *B60W 2050/0026* (2013.01); *Y02T 10/6226* (2013.01)

(56) References Cited

U.S. PATENT DOCUMENTS

| | | | | |
|---|---|---|---|---|
| 6,560,960 | B2* | 5/2003 | Nishimura | F01N 3/0842 123/399 |
| 2002/0014360 | A1* | 2/2002 | Nakakita | B60L 15/2036 180/65.8 |
| 2002/0116099 | A1* | 8/2002 | Tabata | B60K 6/32 701/22 |
| 2002/0179047 | A1* | 12/2002 | Hoang et al. | 123/350 |
| 2004/0008530 | A1* | 1/2004 | Kitahata et al. | 363/131 |
| 2004/0046519 | A1* | 3/2004 | Leonardi et al. | 318/432 |
| 2004/0251064 | A1* | 12/2004 | Imai | B60K 6/442 180/65.23 |
| 2005/0071068 | A1* | 3/2005 | Funato | B60W 10/06 701/54 |
| 2005/0103544 | A1* | 5/2005 | Takami | B60K 6/365 180/65.235 |
| 2007/0205036 | A1* | 9/2007 | Ogata | B60K 6/48 180/337 |
| 2009/0171523 | A1* | 7/2009 | Luo et al. | 701/22 |
| 2010/0045224 | A1* | 2/2010 | Suhama | B60L 7/14 318/434 |
| 2010/0082191 | A1* | 4/2010 | Seo | B60K 6/46 701/22 |
| 2013/0257324 | A1* | 10/2013 | Maekawa | H02P 21/0089 318/400.02 |

FOREIGN PATENT DOCUMENTS

| | | |
|---|---|---|
| JP | 2005-102381 A | 4/2005 |
| JP | 2007-022309 A | 2/2007 |
| JP | 2010-167956 A | 8/2010 |
| KR | 10-0680364 B1 | 2/2007 |

OTHER PUBLICATIONS

Patent Abstracts of Japan and English Machine Translation of JP 2001-339804 A, 14 pages.
Patent Abstracts of Japan and English Machine Translation of JP 2005-102381 A, 8 pages.
Patent Abstracts of Japan and English Machine Translation of JP 2007-022309 A, 9 pages.
Patent Abstracts of Japan and English Machine Translation of JP 2010-167956 A, 13 pages.

* cited by examiner

METHOD AND SYSTEM FOR CONTROLLING MOTOR

CROSS-REFERENCE TO RELATED APPLICATIONS

This application claims priority to and the benefit of Japanese Patent Application No. 2013-021282, filed in the Japanese Intellectual Property Office on Feb. 6, 2013, and Korean Patent Application No. 10-2013-0083782, filed in the Korean Intellectual Property Office on Jul. 16, 2013, the entire contents of all of which are incorporated herein by reference.

BACKGROUND

1. Field

Aspects of embodiments of the present application relate generally to a method for controlling a motor and a system for controlling a motor.

2. Description of the Related Art

Hybrid systems for vehicles are already known (see, for example, Japanese Laid Open Patent No. 2001-339804). The hybrid system may have a motor (such as an electric motor) as a driving source in addition to an engine (such as a gasoline engine), wherein the motor (using, for example, electrical energy) may assist rotation of a crankshaft when the crankshaft rotates in a low rotation speed range as fuel is supplied to the engine. Though it is a tendency that the engine has a low torque in the low rotation speed range, the motor may generate a high torque in the low rotation speed range. Therefore, the motor may efficiently assist rotation of the crankshaft when the crankshaft rotates in the low rotation range.

In the hybrid system, the motor is operated as a generator to recover regenerative power from the motor when the crankshaft decelerates. In the hybrid system, when the vehicle stops, an idling stop is made and, thereafter, the engine is started again by using the motor. However, the motor used in a related art hybrid system has a problem in that the motor has back electromotive force that becomes very high as a rotation speed of a rotor increases. Therefore, if an inverter that connects the motor to a battery is not activated, the back electromotive force generated at the motor may act on the battery. In addition, if the voltage in the battery is low, the back electromotive force generated at the motor may cause battery faults.

Accordingly, in order to prevent the back electromotive force from causing battery faults, some of the hybrid systems (for example, a strong hybrid system, in which acceleration of the vehicle is possible only with the motor, or a mild hybrid system, in which the motor is used as an assist to the engine) make the voltage in the battery high for preventing battery faults from happening because of the back electromotive force. In such hybrid systems, the motor may be operated up to a high rotation speed range because of the high voltage in the battery. That is, these hybrid systems may drive the motor (such as a rotor within the motor) to be synchronized to the rotation of the crankshaft even in the high rotation speed range. However, such hybrid systems have problems in that the battery becomes large, expensive, and difficult to handle.

Consequently, in order to solve these problems, instead of using a strong hybrid system or a mild hybrid system, a micro-hybrid system is suggested. In a micro-hybrid system, the motor is driven by using a low voltage battery (for example, a battery having a voltage in a range of 30 V (volts) to 60 V). However, since the voltage in the battery is low, the micro-hybrid system may, for example, have to use a motor having an output lower than the strong hybrid system.

For instance, though the strong hybrid system may have a highest motor power of 60 kW (kilowatts), the micro-hybrid system may have a highest motor power of, for example, 1.8 kW (or about 1.8 kW). Moreover, the micro-hybrid system may use the motor for limited purposes, such as engine starting (including re-starting the engine after an idling stop), and recovery of the regenerative power from deceleration of the crankshaft in a medium rotation speed range or a high rotation speed range.

That is, in order to prevent battery faults caused by the back electromotive force, in the micro-hybrid system, the motor may not be capable of assisting the rotation of the crankshaft when the crankshaft rotates in a high rotation speed range. In other words, in the related art micro-hybrid systems, the motor may not be synchronized to the rotation of the crankshaft when the crankshaft rotates in a high rotation speed range. Moreover, in the micro-hybrid system, since the motor has a low output (e.g., a low torque), the motor also cannot assist the rotation of the crankshaft when the crankshaft rotates in a low rotation speed range.

The above information disclosed in this Background section is only for enhancement of understanding of the background of the present invention. Therefore, it may contain information that does not form the prior art that is already known in this country to a person of ordinary skill in the art.

SUMMARY

Aspects of embodiments of the present invention provide for a method of controlling a motor and a system for controlling a motor using a low voltage battery capable of assisting the driving of an engine with a high torque in a low rotation speed range and of synchronizing the driving in a high rotation speed range.

According to an embodiment of the present invention, a motor controlling method is provided. The method includes controlling a motor connected to a low voltage battery. The motor has a reluctance torque higher than a magnetic torque at a time of a highest torque generation. The motor includes a rotor connected to an output shaft of an engine.

The low voltage battery may have a voltage lower than 60 V.

The method may further include supplying fuel to the engine to rotate the output shaft in a low rotation speed range or a high rotation speed range, and supplying power from the low voltage battery to the motor to give a torque to the output shaft in a same direction as a rotation direction of the output shaft.

The method may further include supplying more torque to the output shaft when rotating the output shaft in the low rotation speed range than when rotating the output shaft in the high rotation speed range.

The method may further include decelerating the output shaft in a low rotation speed range or a high rotation speed range, recovering regenerative power from the motor, and supplying the recovered power to the low voltage battery.

The method may further include decelerating the output shaft in the low rotation speed range with a decelerating torque higher than a decelerating torque in the high rotation speed range, recovering regenerative power from the motor, and supplying the recovered power to the low voltage battery.

The rotor may be directly connected to the output shaft.

Of opposite ends of the output shaft, the rotor may be directly connected to an end opposite to an end to which a gearbox is connected.

The method may further include supplying power from the low voltage battery to the motor to rotate the output shaft when the engine is stopped.

According to another embodiment of the present invention, a motor control system is provided. The motor control system includes a motor connected to a low voltage battery, and a first control unit configured to control the motor. The motor has a reluctance torque higher than a magnetic torque at a time of a highest torque generation. The motor includes a rotor connected to an output shaft of an engine.

The low voltage battery may have a voltage lower than 60 V.

When fuel is supplied to the engine to rotate the output shaft in a low rotation speed range or a high rotation speed range, the first control unit may be configured to control a power supply from the low voltage battery to the motor to give a torque to the output shaft in a same direction as a rotation direction of the output shaft.

The first control unit may be further configured to maintain a torque being supplied to the output shaft when the output shaft is rotating in the low rotation speed range to be higher than a torque being supplied to the output shaft when the output shaft is rotating in the high rotation speed range.

The first control unit may be further configured to recover regenerative power from the motor and supply the regenerative power to the low voltage battery when the output shaft is decelerating in a low rotation speed range or a high rotation speed range.

The first control unit may be further configured to recover the regenerative power from the motor and to supply the regenerative power to the low voltage battery when the output shaft is being decelerated in the low rotation speed range with a decelerating torque higher than a decelerating torque in the high rotation speed range.

The rotor may be directly connected to the output shaft.

Of opposite ends of the output shaft, the rotor may be directly connected to an end opposite to an end to which a gearbox is connected.

The first control unit may be further configured to supply power from the low voltage battery to the motor to make the output shaft rotate when the engine is stopped.

According to yet another embodiment of the present invention, a vehicle comprising the above motor control system is provided.

DETAILED DESCRIPTION

Embodiments of the present invention are described herein with reference to the accompanying drawings such that a person of ordinary skill in the art may practice the present invention without undue experimentation. However, the present invention may be embodied in many different forms, and is not limited to the embodiments described herein.

Figure 1:
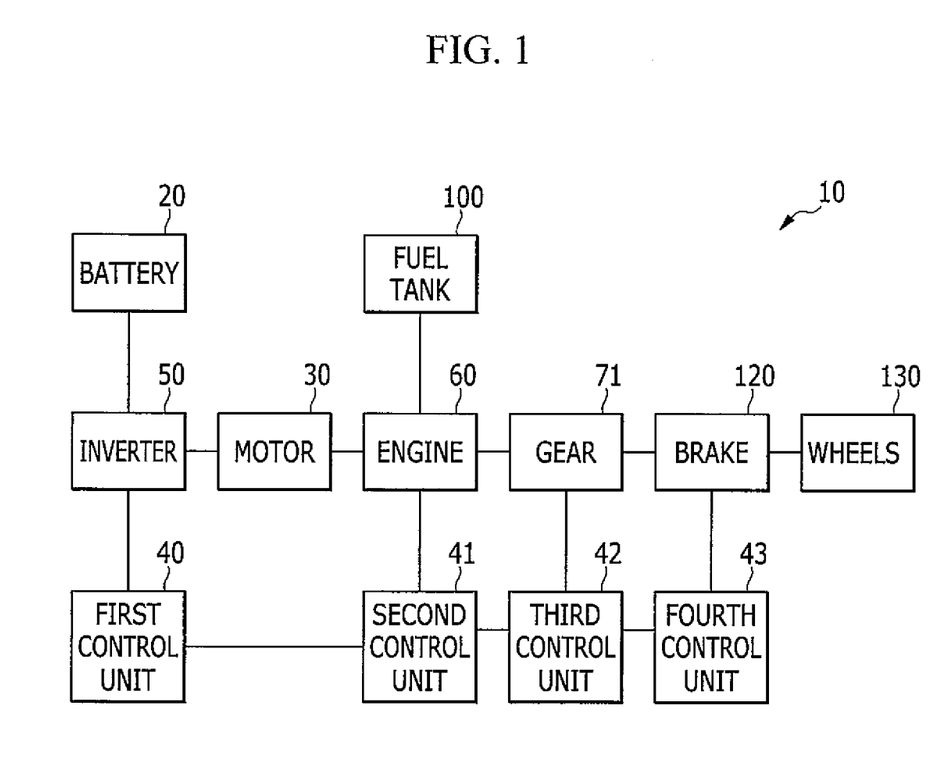
FIG. 1 is a block diagram of a motor control system in accordance with an embodiment of the present invention.

Though embodiments of motor control systems, such as motor control system 10 of FIG. 1, are described herein in terms of being part of a vehicle, the motor control systems of the present invention are not limited to vehicular motor control systems, but rather are also applicable to motor control systems of other drive devices. Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

In accordance with an embodiment of the present invention, a low rotation speed range may be 0 RPM (revolutions per minute) to 3000 RPM, a medium rotation speed range may be 3000 RPM to 4500 RPM, and a high rotation speed range may be a range higher than 4500 RPM. However, the low rotation speed range, the medium rotation speed range, and the high rotation speed range are not limited to these rotation ranges, and may be defined as rotation ranges having other RPMs, as appropriate for the application (such as a drive device) for which the motor control system is directed.

For ease of description, a low voltage battery (for example, a battery having a voltage between 30 V and 60V) may be used in a micro-hybrid system. Accordingly, such a battery may have a small size, and may also have a low cost.

When a battery with a voltage higher than 60 V is mounted in a vehicle, it may be required (e.g., for safety) to enclose and seal the battery perfectly such that no user can access the battery. Therefore, if a battery with a voltage higher than 60 V is mounted in a vehicle, handling of the battery becomes difficult and a configuration of the hybrid system becomes complicated. However, if the voltage of the battery is lower than 60 V, it is not required to use such a protected battery (for which handling is difficult) or a hybrid system having such a complicated configuration.

By using a battery having a voltage lower than 60 V in the hybrid system, handling of the battery may become easy and the configuration of the hybrid system may become simple. Accordingly, the micro-hybrid system is also favorable for making the configuration of the system simple.

However, as described before, related art micro-hybrid systems use a low output motor and the motor does not assist with the driving (in order to prevent the battery from breaking down due to the back electromotive force). Because of this, in the related art micro-hybrid systems, features such as the drive assist with the high torque in the low rotation speed range and the synchronized drive in the high rotation speed range cannot be provided.

In one or more embodiments of the present invention, motors capable of delivering a high torque in the low rotation speed range of the rotor, and that have relatively low back electromotive force in the high rotation speed range of the rotor are provided. For example, such properties are available in motors whose reluctance torque is higher than their magnetic torque at the time of highest torque generation. Here, the reluctance torque may refer to a torque generated only by attraction forces between poles of a rotating magnetic field of a stator and salient poles of the rotor.

In contrast, the magnetic torque may refer to a torque generated by attraction and repulsion between the poles of the rotating magnetic field of the stator and magnetic poles of permanent magnets of the rotor.

Example motors having a reluctance torque higher than their magnetic torque at the time of highest torque generation may be, for example, permanent-magnet reluctance motors, or PRMs for short. The PRM may have a ratio of reluctance torque to magnetic torque of 6:4 (60/40) down to 5:5 (50/50) at the time of highest torque generation.

Figure 5:
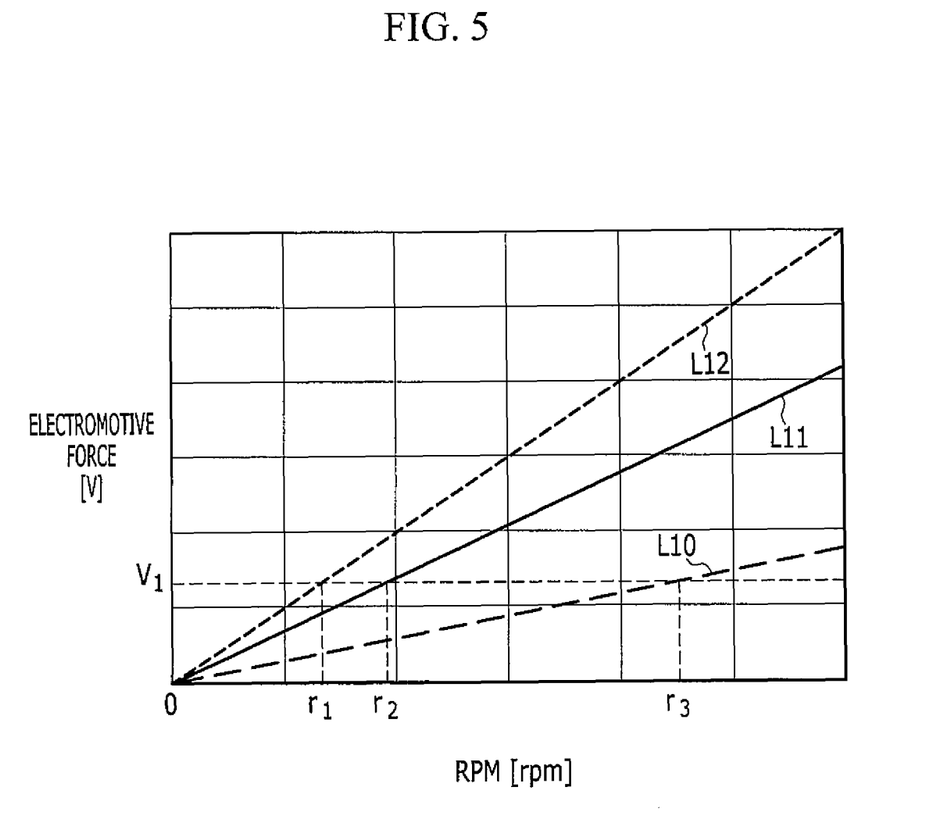
FIG. 5 is a graph showing a comparison of characteristics (RPM vs. back electromotive force) of a permanent magnet reluctance motor (PRM) to other motors.

FIG. 5 is a graph for comparing characteristics (RPM vs. back electromotive force) of the PRM with other motors.

Referring to FIG. 5, graph L10 shows a quantitative comparison of RPM to the back electromotive force of the PRM. In addition, graph L11 shows a comparison of RPM to back electromotive force of an interior permanent-magnet motor (IPM). Further, graph L12 shows a comparison of RPM to back electromotive force of a surface permanent-magnet motor (SPM). Here, SPMs and IPMs are motors generally used in the related art hybrid systems.

The SPM rotates the rotor only with the magnetic torque (and thus has no reluctance torque), while the IPM has a ratio of reluctance torque to magnetic torque of 3:7 (30/70) at the time of highest torque generation. Thus, neither the SPM nor the IPM motor has a reluctance torque higher than the magnetic torque at the time of highest torque generation.

SPMs and IPMs may generate a high torque in the low rotation speed range. However, referring to FIG. 5, the motors have very high back electromotive force in the high rotation speed range. The back electromotive force comes from the permanent magnets in these motors.

By contrast, the PRM may embody high torque in the low rotation speed range. Further, the PRM may embody high torque with a (electric) current lower than the SPM and the IPM in the low rotation speed range. Moreover, the PRM has significantly lower back electromotive force than the SPM the IPM in the high rotation speed range.

In the PRM, the reluctance torque is higher than the magnetic torque at the time of highest torque generation. Thus, in the PRM, since reluctance torque is higher than the magnetic torque at the time of highest torque generation, influence from the magnetic torque caused by the permanent magnets is low even in the high rotation speed range. Because of this, the PRM has significantly lower back electromotive force than the SPM and the IPM in the high rotation speed range.

For example, in FIG. 5, the hybrid system having an SPM with a battery having a voltage V1 therein can rotate the rotor of the SPM only up to a rotation speed of $r_1$. Likewise, the hybrid system having an IPM with a battery having a voltage V1 therein can rotate the rotor of the IPM only up to a rotation speed of $r_2$. By comparison, the hybrid system having a PRM with a battery having a voltage V1 therein can rotate the rotor of the PRM up to a rotation speed of $r_3$. Accordingly, even if the voltage in the battery is low, the PRM may embody high torque in the low rotation speed range, and may rotate the rotor up to a rotation speed range higher than the SPM and the IPM.

Moreover, the PRM is smaller and lighter than the SPM and the IPM. That is, the PRM has a high torque and a high output per unit volume and unit mass (i.e., a high torque concentration and a high output concentration).

The PRM also functions as a generator when an output shaft (such as a crankshaft in a vehicular engine) of the engine decelerates, and the hybrid system having a PRM may also recover the regenerative power from the PRM. Moreover, the PRM functions as a generator when the crankshaft decelerates in a low rotation speed range or a high rotation speed range.

Thus, a motor (hereinafter, also called a high reluctance torque motor) of which the reluctance torque is higher than the magnetic torque at the time of highest torque generation may embody high torque in the low rotation speed range, and may rotate the rotor to a rotation speed range higher than the SPM and the IPM. Further, the high reluctance torque motor has a significantly smaller size than the SPM and the IPM. In addition, a hybrid system having a high reluctance torque motor may recover the regenerative power from the crankshaft when the crankshaft decelerates. While switched reluctance motors (SRMs) and induction motors (IMs) are also known vehicular motors, these motors cannot perform regeneration of power.

According to one or more embodiments of the present invention, a motor control system 10 having a high reluctance torque motor is provided. Such a motor control system 10 will now be described.

Figure 2:
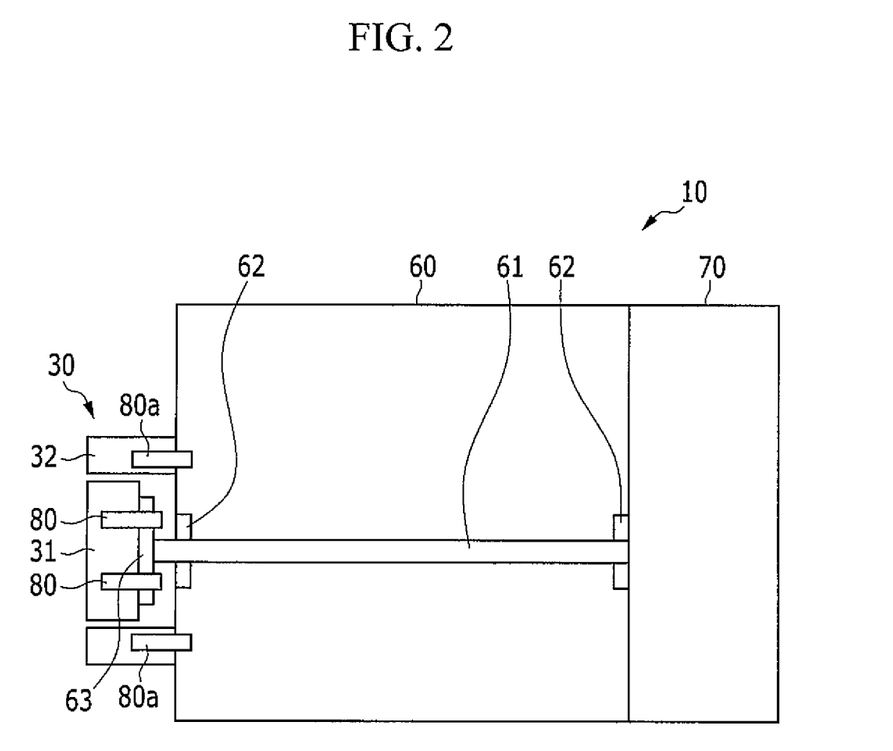
FIG. 2 is a schematic view showing a connection between a motor and an engine according to an embodiment of the present invention.

FIG. 1 is a block diagram of a motor control system 10 in accordance with an embodiment of the present invention. FIG. 2 is a schematic view showing a connection between a motor and an engine according to an embodiment of the present invention.

Referring to FIGS. 1 and 2, the motor control system 10 is a micro-hybrid system mounted in a vehicle and includes a battery 20, a motor 30 including a rotor 31 and a stator 32, first to fourth control units 40, 41, 42 and 43, an inverter 50, an engine 60 including an output (or crank) shaft 61, a gear box 70 including a gear 71, fuel tank 100, a brake 120, and wheels 130.

The engine 60 includes the crankshaft 61, bearings 62 for supporting the crankshaft 61, and a driving mechanism for rotating the crankshaft 61 (for example, cylinders, pistons, connecting rods, ignition plugs, a camshaft, and so on). The gear box 70 is connected to one side end of the crankshaft 61 and is for changing a torque and an RPM transmitted from the camshaft with the gear 71 therein, and for transmitting the same to the wheels 130.

The fuel tank 100 supplies fuel to the engine 60 under the control of the second control unit 41. The brake 120 is applied to the wheels 130 under the control of the fourth control unit 43. The battery 20 in accordance with the embodiment is a low voltage battery with a voltage of between 30 V and 60 V.

By using the battery 20 with a voltage below 60 V, the battery 20 may be downsized, thus making a lower cost battery available, and simplifying an entire configuration of the motor control system 10. Further, the voltage in the battery 20 is substantially the same as the voltage of the battery 20. Therefore, the voltage in the battery 20 is low.

The motor 30 is a high reluctance torque motor. In this case, the high reluctance torque motor may be or include a PRM. The motor 30 may embody a high torque in the low rotation speed range, and has low back electromotive force in the high rotation speed range. Therefore, the motor 30 may embody high torque in the low rotation speed range even when the motor 30 is connected to a low voltage battery, such as the battery 20, and may rotate or accelerate the rotor up to the high rotation speed range.

That is, the motor 30 may transition between high torque in the low rotation speed range to the synchronized operation with the engine 60 in the high rotation speed range. In addition, the motor 30 may supply the regenerative power to the battery 20 even when a high deceleration torque acts from the crankshaft 61 in deceleration to the low rotation speed range.

The motor 30 is controlled by the first control unit 40. Operations performed by the motor 30 controlled by the first control unit 40 will now be described in further detail.

The motor 30 starts the engine 60 by rotating the crankshaft 61 when the engine 60 is stationary or stopped. Such an engine starting includes re-starting the engine after an idling stop, too. In addition, the motor 30 assists rotation of the crankshaft 61 when the crankshaft 61 rotates in the low rotation speed range. That is, the motor 30 supplies a torque in the same direction as the rotation direction of the crankshaft 61.

Further, the motor 30 may assist rotation of the crankshaft 61 when the crankshaft 61 rotates in the medium rotation speed range or the high rotation speed range. However, the torque given to the crankshaft 61 in the low rotation speed range is higher than the torque given to the crankshaft 61 in the medium rotation speed range and the high rotation speed range. Therefore, the motor 30 (such as a rotor in the motor) is synchronized with the crankshaft 61 when the crankshaft 61 rotates in the medium rotation speed range and the high rotation speed range.

In addition, the motor 30 functions as a generator when the crankshaft 61 decelerates in any one of the low rotation speed range, the medium rotation speed range and the high rotation speed range, to supply the regenerative power to the battery 20. In this case, the motor 30 may supply the regenerative power to the battery 20 even when a high deceleration torque acts from the crankshaft 61 in response to deceleration in the low rotation speed range.

Figure 3:
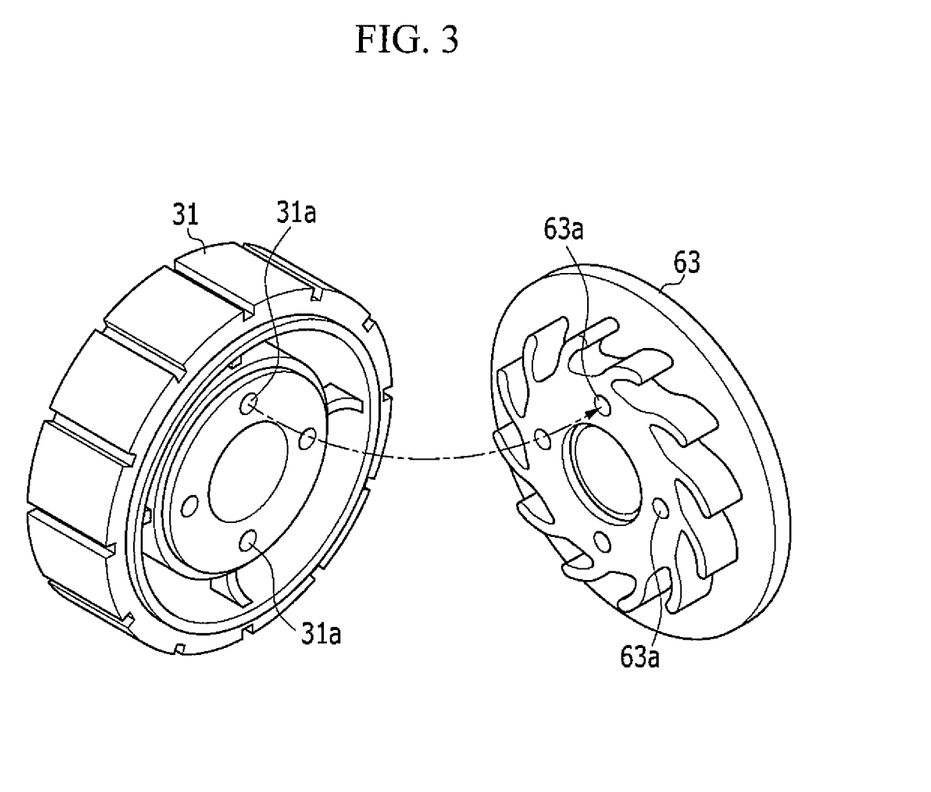
FIG. 3 is a perspective view showing a connection between a rotor of a motor and a crankshaft according to an embodiment of the present invention.

FIG. 3 is a perspective view showing a connection between a rotor of a motor and a crankshaft according to an embodiment of the present invention. Referring to FIGS. 2 and 3, the motor 30 includes a rotor 31 and a stator 32. Here, the rotor 31 is cylindrical and includes salient poles and permanent magnets, while stator 32 is cylindrical to cover a circumferential surface of the rotor 31 and includes a coil.

The motor 30 generates reluctance torque and magnetic torque as a current flows to the coil of the stator 32, and the torques rotate the rotor 31. In this case, the reluctance torque is higher than the magnetic torque at the time of highest torque generation.

For example, a ratio of the reluctance torque to the magnetic torque at the time of highest torque generation may be 6:4 to 5.5. Further, the output of the motor 30 may be 7 kW (or about 7 kW). However, even though the motor 30 can deliver high torque in the low rotation speed range as well as synchronized operation in the high rotation speed range, the output of the motor 30 is not limited to 7 kW.

The rotor 31 is directly coupled to the crankshaft 61. In more detail, the crankshaft 61 has the other side end (that is, an end that the gear box 70 is not connected to) with a crankshaft pulley 63 formed or otherwise attached thereon, to which the rotor 31 is connected. Referring to FIG. 3, the crankshaft pulley 63 has a plurality of screw holes 63a formed therein for pass-through of bolts (such as bolts 80 of FIG. 2) and the rotor 31 has one side matched to the screw holes 63a having bolt pass-through screw holes 31a formed therein. The crankshaft pulley 63 and the rotor 31 are connected with bolts 80. In addition, the rotation shaft of the rotor 31 is matched to a rotation shaft of the crankshaft 61.

However, the direct coupling of the rotor 31 to the crankshaft 61 is not limited to above method. For example, in other embodiments, the rotor 31 may be connected to the crankshaft 61 without the crankshaft 61 being passed through the crankshaft pulley 63.

The stator 32 is connected to the engine 60 with bolts 80a.

In order to assist rotation of the crankshaft 61 with the motor 30, the motor 30 is required to generate a high torque. In particular, a high torque is required at the time of engine starting. Since the motor 30 is a high reluctance torque motor, the motor 30 has a high torque in the low rotation speed range. Therefore, even if the motor 30 is directly connected to the crankshaft 61, the motor 30 may adequately assist rotation of the crankshaft 61.

Moreover, since the motor 30 is directly connected to the crankshaft 61, the torque may be efficiently supplied to the crankshaft 61. Therefore, the motor 30 may make stable engine starting even in cold cranking.

In more detail, the battery 20 is at a high risk of breakage by an external impact or the like when the temperature of the battery 20 is extremely low (for example, about −30° C.), such as for cold weather cranking with a cold engine. Therefore, it may be desirable that a current drawn from the battery 20 be as small as possible. The motor 30 may embody a high torque with a low intensity current in the low rotation speed range, and the torque of the motor 30 may be efficiently transmitted to the crankshaft 61. Therefore, since the motor 30 may transmit high torque to the crankshaft 61 even if only a low intensity current is supplied to the motor 30, the motor 30 may make stable engine starting even in the case of cold cranking.

In another embodiment, the rotor 31 of the motor 30 may be connected to the crankshaft 61 via a belt and a gear. However, in the related art micro-hybrid system, the rotor of the motor is connected to the crankshaft via a belt and a gear. In the related art micro-hybrid system, since the output of the motor is low, even if the rotor of the motor is directly connected to the crankshaft, the motor cannot supply a torque required for engine starting to the crankshaft. However, by connecting the rotor 31 of the motor 30 to the crankshaft 61 via the belt and the gear, the related art micro-hybrid system may be easily converted to the motor control system 10 in accordance with an embodiment of the present invention.

Nevertheless, a transmission loss of the belt is liable to make stability of the cold cranking poor in such a converted motor control system. In addition, a forwarding speed of the torque will also become poor. Accordingly, it may be desirable that the rotor 31 of the motor 30 be directly connected to the crankshaft 61. The direct connection also enables vibration suppression control in which vibration from the motor 30 is suppressed.

Referring to FIG. 2, the motor 30 is mounted on an opposite side of the gear box 70. Therefore, the motor 30 can be mounted on the engine 60 without substantial change of a connection mechanism of the engine 60 and the gear box 70. That is, the present motor control system 10 is easily applicable to an existing vehicle.

Since the rotor 31 is directly connected to the crankshaft 61, heat is able to transfer from the crankshaft 61 to the permanent magnets of the rotor 31. However, the rotor 31 of the motor 30 has a characteristic in which the heat transfer to the permanent magnets is difficult when the rotor 31 rotates in the high rotation speed range. Further, since a method for supplying a current to the motor 30 is different from other motors (for example, the SPM and the IPM), heat generation from the permanent magnets is difficult. Accordingly, even if some heat transfers from the crankshaft 61 to the permanent magnets of the rotor 31, it is difficult for enough heat to transfer to the permanent magnets to change the characteristics of the permanent magnets.

By contrast, when the SPM and the IPM rotate in the high rotation speed range, since much of the heat is able to transfer to the permanent magnets, if the SPM or IPM is also directly connected to the crankshaft 61, the heat from the crankshaft 61 is able to make the temperature of the permanent magnets rise to a temperature that changes the characteristics of the permanent magnets. Therefore, it is not desirable to directly connect the SPM or IPM to the crankshaft 61 for operating the hybrid system.

Since the motor 30 is lightweight, the vibration transmitted to the crankshaft 61 from the rotor 31 when the rotor 31 rotates is reduced. This may also allow a low strength material to be used to form the bearing 62, thus saving on fabrication cost of the bearing 62.

In the meantime, since the SPM and IPM are heavier than the motor 30, if the SPM or IPM is directly connected to the crankshaft 61, then the strength of the bearing 62 needs to be increased, thereby increasing the fabrication cost of the bearing 62. Accordingly, under the above reasoning, it is not desirable to directly connect the SPM or IPM to the crankshaft 61.

Moreover, since the motor 30 is small sized, the motor 30 may be directly connected to the crankshaft 61. In addition, though space around the engine 60 is small, since the motor 30 is of a small size, the motor 30 may be easily disposed in a small space around the engine 60.

However, since the size of the SPM or IPM is large, it is not easy to dispose the SPM or IPM in the small space around the engine 60. Therefore, for these reasons, it is not desirable to directly connect the SPM or IPM to the crankshaft 61.

The second control unit 41 controls the entire motor control system 10. For example, if the second control unit 41 has an engine starting request from the user (for example, when an ignition switch is turned on or an accelerator pedal is stepped on after an idling stop), the second control unit 41 requests the first control unit 40 to start the engine. In addition, after the engine is started, the second control unit 41 controls the fuel supply from the fuel tank 100 to the engine 60, to drive the engine 60.

Further, the second control unit 41 monitors an RPM of the engine (such as an RPM of the crankshaft 61) while the engine is driven, and forwards information on the engine driving to the first control unit 40 resulting from the monitoring. In addition, the second control unit 41 may monitor a vehicle speed, and if the vehicle speed is zero (i.e., the vehicle is stopped), it stops the engine 60 to control an idling stop. Moreover, when information on brake usage is provided from the fourth control unit 43, the second control unit 41 stops fuel supply from the fuel tank 100 at the same time with requesting regeneration control to the first control unit 40.

The first control unit 40 controls the motor 30 via the inverter 50 under the control of the second control unit 41. In further detail, when the first control unit 40 receives the engine-starting request from the second control unit 41, the first control unit 40 controls the motor 30 to start the engine. In addition, the first control unit 40 controls the motor 30 according to the information on the engine driving. For example, when supplying power to the motor 30 from the battery 20 when the crankshaft 61 rotates in the low rotation speed range, the first control unit 40 makes the motor 30 generate a high torque (such as a torque in the same direction as the rotation direction of the crankshaft 61). Then the first control unit 40 assists rotation of the crankshaft 61 with the high torque.

In addition, the first control unit 40 supplies power to the motor 30 from the battery 20 when the crankshaft 61 rotates in the medium rotation speed range or the high rotation speed range for generating a torque (such as a torque in the same direction as a rotation direction of the crankshaft 61) at the motor 30. Then, the first control unit 40 assists rotation of the crankshaft 61 with the torque.

That is, the first control unit 40 may control the motor 30 to be driven in synchronization with the crankshaft 61 even when the crankshaft 61 rotates in the high rotation speed range. In addition, the first control unit 40 may make the motor 30 function as a generator whether the crankshaft 61 is rotating in the low rotation speed range, the medium rotation speed range, or the high rotation speed range.

That is, if given a regeneration request from the second control unit 41, the first control unit 40 makes the motor 30 function as a generator to supply the regenerative power from the motor 30 to the battery 20 regardless of the RPM of the crankshaft 61. In addition, the third control unit 42 controls operation of the gear 71, while the fourth control unit 43 operates the brake 120 when the user steps on a brake pedal, and forwards the information on the brake operation to the second control unit 41.

Figure 4:
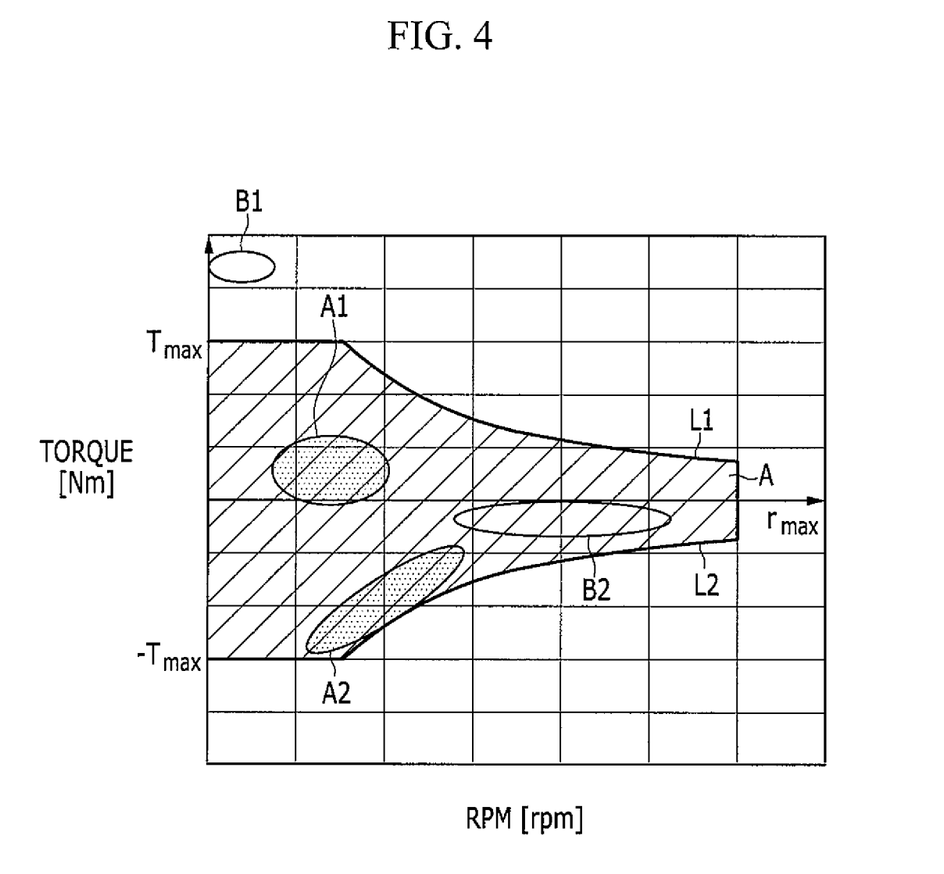
FIG. 4 is a graph showing characteristics of a motor (RPM vs. torque) in accordance with an embodiment of the present invention.

FIG. 4 is a graph showing characteristics of a motor (RPM vs. torque) in accordance with an embodiment of the present invention.

Referring to FIG. 4, graph L1 shows an RPM of the rotor 31 and a highest torque available at the RPM. In this case, $T_{max}$ denotes the highest torque continuously available from the rotor 31 for 10 seconds. In addition, graph L2 shows an RPM of the rotor 31 and a highest deceleration torque possible to input to the rotor 31 at the RPM. In this case, $-T_{max}$ denotes the highest deceleration torque possible to continuously input to the rotor 31 for 10 seconds. Here, FIG. 4 illustrates the deceleration torque as a negative value.

$r_{max}$ denotes a highest RPM of the rotor 31. As such, it may be desirable that the highest RPM is higher than the highest RPM of the crankshaft 61. As can be seen in FIG. 4, the motor 30 is operable throughout an entire rotation range of the crankshaft 61.

Region B1 denotes a motor characteristic at the time of engine starting. That is, the motor 30 can supply a torque higher than $T_{max}$ for about 0.5 to 2 seconds to the crankshaft 61 at the time of engine starting.

Region B2 denotes a region at which regeneration is performed in the medium rotation speed range and the high rotation speed range. The motor 30 is operable at all regions in a region A surrounded by graphs L1-L2 and also including region B1. That is, within region A when the torque is greater than zero, the rotor 31 of the motor 30 may rotate in synchronization with the crankshaft 61, and may assist rotation of the crankshaft 61. Further, the rotor 31 may supply a torque to the crankshaft 61 in the same direction as the rotation direction of the crankshaft 61.

In addition, within region A when the torque is less than zero, the rotor 31 of the motor 30 may rotate in synchronization with the crankshaft 61, and may function as a generator. That is, the motor 30 may recover the regenerative power and supply the regenerative power to the battery 20.

Regions B1 and B2 are also regions at which the motor in the related art micro-hybrid system works. That is, as described above, in the related art micro-hybrid system, the motor may not but recover the regenerative power at the time of engine starting or in the medium rotation speed range or the high rotation speed range. However, the motor 30 is operable at all portions of region A surrounded by the graphs L1-L2 in addition to the region B1.

Therefore, the motor 30 may start the engine, and assist rotation of crankshaft 61 with high torque when the crankshaft 61 rotates in the low rotation speed range (see region A1 and portions of region A with a torque higher than the region A1). In addition, the motor 30 may assist rotation of the crankshaft 61 when the crankshaft 61 rotates in the medium speed rotation range or the high rotation speed range. That is, the motor 30 may be driven in synchronization with the crankshaft 61 even when the crankshaft 61 rotates in the medium speed rotation range or the high rotation speed range.

Further, the motor 30 functions as a generator in the low rotation speed range, the medium speed rotation range, and the high rotation speed range. For instance, the motor 30 functions as the generator even when the crankshaft 61 is decelerating in the low rotation speed range with a decelerating torque higher than the decelerating torque in the high rotation speed range. See, for example, region A2.

The motor control system 10 controls the motor 30 connected to the low voltage battery 20, having a reluctance torque that is higher than the magnetic torque at the time of highest torque generation. Further, the rotor 31 is connected (such as directly connected) to the crankshaft 61 of the engine 60. Therefore, the hybrid system 10 may assist with the engine driving with a high torque in the low rotation speed range while also being capable of doing synchronized driving in the high rotation speed range.

In addition, in the motor control system 10, since the voltage of the battery 20 is lower than 60 V, handling of the battery 20 is easy, and a configuration of the motor control system 10 is simple. Further, the motor 30 may assist the engine driving with a high torque in the low rotation speed range while being compatible with synchronized driving in the high rotation speed range due to the above configurations.

In addition, the motor control system 10 may assist rotation of the crankshaft 61 when the crankshaft 61 is rotating in the low rotation speed range or the high rotation speed range. Further, in the motor control system 10, the torque being supplied to the crankshaft 61 when the crankshaft 61 is rotating in the low rotation speed range is higher than the torque being supplied to the crankshaft 61 when the crankshaft 61 is rotating in the high rotation speed range. Therefore, the motor control system 10 may supply a torque to the crankshaft 61 in the low rotation speed range that is higher than a torque to be supplied to the crankshaft 61 in the high rotation speed range.

In addition, the motor control system 10 may recover the regenerative power from the motor 30 when the crankshaft 61 decelerates in the low rotation speed range or in the high rotation speed range. Further, the motor control system 10 may recover the regenerative power from the motor 30 when the crankshaft 61 is decelerating with a decelerating torque higher than the decelerating torque in the high rotation speed range. Accordingly, the motor control system 10 may more efficiently recover the regenerative power in the low rotation speed range.

In addition, since the rotor 31 is directly coupled to the crankshaft 61, in the motor control system 10, the torque may be efficiently supplied from the rotor 31 to the crankshaft 61, and the regenerative power may be efficiently recovered. Further, of the opposite ends of the crankshaft 61, since the rotor 31 is connected to the end of the crankshaft 61 opposite to the end connected to the gear box 70, the motor control system 10 may be introduced to the vehicle without many changes to the existing system. Furthermore, the motor control system 10 may start the engine.

As described above, since the rotor 31 and the crankshaft 61 are directly connected, the torque may be efficiently transmitted from the rotor 31 to the crankshaft 61 at the time of engine starting. That is, the motor control system 10 may transmit a high torque to the crankshaft 61 with a small amount of current.

Accordingly, the motor control system 10 may make stable engine starting even at the time of cold cranking and in cold weather. In addition, since the motor control system 10 may be mounted in the vehicle, the vehicle may be driven efficiently due to the motor control system 10.

Thus, though example embodiments of the present invention have been described, the present invention is not limited to these, but it is apparent that different variations may be possible within the claims and their equivalents, the detailed description of the present invention, and the accompanying drawings, all of which also fall under the scope of the present invention.

For example, though some of the above embodiments suggest application of the motor control system to a vehicle hybrid system, other embodiments of the present invention may be applied to any system as far as the system uses the engine and the motor in parallel.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims and their equivalents.

DESCRIPTION OF SYMBOLS

| | |
|---|---|
| 10: motor control system (hybrid system) | 20: battery |
| 30: motor | 31: rotor |
| 32: stator | 40-43: first-fourth control units |
| 50: inverter | 60: engine |
| 61: crankshaft (output shaft) | 70: gearbox |
| 100: fuel tank | 120: brake |
| 130: wheel | |

What is claimed is:

1. A method of controlling a motor connected to a battery, the motor having a reluctance torque higher than a magnetic torque at a time of a highest torque generation, and comprising a rotor connected to an output shaft of an engine, the method comprising:
   decelerating the output shaft with a first applied torque when in a high rotation speed range;
   decelerating the output shaft with a second applied torque that is larger than the first applied torque when in a low rotation speed range,
   supplying fuel to the engine to rotate the output shaft in the low rotation speed range or the high rotation speed range;
   supplying power from the battery to the motor to give a torque to the output shaft in a same direction as a rotation direction of the output shaft; and
   supplying more torque to the output shaft when rotating the output shaft in the low rotation speed range than when rotating the output shaft in the high rotation speed range,
   wherein the first and second applied torques cause the output shaft's rotation speed to decrease,
   wherein the magnetic torque is a torque generated by attraction and repulsion between poles of the rotating magnetic field of a stator and magnetic poles of permanent magnets of the rotor,
   wherein the reluctance torque is a torque generated only by attraction forces between poles of a rotating magnetic field of the stator and salient poles of the rotor.

2. The method of claim 1, wherein the battery has a voltage lower than 60 V.

3. The method of claim 1, further comprising:
   decelerating the output shaft in the low rotation speed range or the high rotation speed range;
   recovering regenerative power from the motor; and
   supplying the recovered power to the battery.

4. The method of claim 1, further comprising:
   recovering regenerative power from the motor; and
   supplying the recovered power to the battery.

5. The method of claim 1, wherein the rotor is directly connected to the output shaft.

6. The method of claim 5, wherein, of opposite ends of the output shaft, the rotor is directly connected to an end opposite to an end to which a gearbox is connected.

7. The method of claim 6, further comprising supplying power from the battery to the motor to rotate the output shaft when the engine is stopped.

8. A motor control system comprising:
a motor connected to a battery, the motor having a reluctance torque higher than a magnetic torque at a time of a highest torque generation, and comprising a rotor connected to an output shaft of an engine; and
a first control unit configured to control the motor,
wherein the first control unit is further configured to recover regenerative power from the motor and to supply the regenerative power to the battery by:
applying a first torque when the output shaft is being decelerated in a high rotation speed range; and
applying a second torque, that is larger than the first torque, when the output shaft is being decelerated in a low rotation speed range,
wherein the first and second applied torques cause the output shaft's rotation speed to decrease,
wherein the magnetic torque is a torque generated by attraction and repulsion between poles of a rotating magnetic field of a stator and magnetic poles of permanent magnets of the rotor,
wherein the reluctance torque is a torque generated only by attraction forces between poles of the rotating magnetic field of the stator and salient poles of the rotor,
wherein, when fuel is supplied to the engine to rotate the output shaft in the low rotation speed range or the high rotation speed range, the first control unit is configured to control a power supply from the battery to the motor to give a torque to the output shaft in a same direction as a rotation direction of the output shaft, and
wherein the first control unit is further configured to maintain a torque being supplied to the output shaft when the output shaft is rotating in the low rotation speed range to be higher than a torque being supplied to the output shaft when the output shaft is rotating in the high rotation speed range.

9. The motor control system of claim 8, wherein battery has a voltage lower than 60 V.

10. The motor control system of claim 8, wherein the first control unit is further configured to recover regenerative power from the motor and supply the regenerative power to the battery when the output shaft is decelerating in the low rotation speed range or the high rotation speed range.

11. The motor control system of claim 8, wherein the rotor is directly connected to the output shaft.

12. The motor control system of claim 11, wherein, of opposite ends of the output shaft, the rotor is directly connected to an end opposite to an end to which a gearbox is connected.

13. The motor control system of claim 12, wherein the first control unit is further configured to supply power from the battery to the motor to make the output shaft rotate when the engine is stopped.

14. A vehicle comprising the motor control system of claim 8.

* * * * *